(12) United States Patent
McDaniel et al.

(10) Patent No.: US 8,211,988 B2
(45) Date of Patent: Jul. 3, 2012

(54) METHODS OF PREPARING A POLYMERIZATION CATALYST

(75) Inventors: Max P. McDaniel, Bartlesville, OK (US); Kathy S. Collins, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 578 days.

(21) Appl. No.: 12/113,061

(22) Filed: Apr. 30, 2008

(65) Prior Publication Data

US 2009/0275710 A1 Nov. 5, 2009

(51) Int. Cl.
*C08F 4/24* (2006.01)

(52) U.S. Cl. .......................................... 526/106

(58) Field of Classification Search .................... 526/106
See application file for complete search history.

(56) References Cited

U.S. PATENT DOCUMENTS

| | | |
|---|---|---|
| 3,248,179 A | 4/1966 | Norwood |
| 3,662,522 A | 5/1972 | Della Porta et al. |
| 3,676,417 A | 7/1972 | Horvath |
| 3,884,832 A | 5/1975 | Pullukat et al. |
| 3,941,761 A | 3/1976 | Pullukat et al. |
| 3,976,632 A | 8/1976 | Delap |
| 4,367,342 A | 1/1983 | Wulff et al. |
| 4,501,885 A | 2/1985 | Sherk et al. |
| 4,588,790 A | 5/1986 | Jenkins, III et al. |
| 5,352,749 A | 10/1994 | DeChellis et al. |
| 5,436,304 A | 7/1995 | Griffin et al. |
| 5,455,314 A | 10/1995 | Burns et al. |
| 5,565,175 A | 10/1996 | Hottovy et al. |
| 5,575,979 A | 11/1996 | Hanson |
| 5,733,518 A | 3/1998 | Durante et al. |
| 6,239,235 B1 | 5/2001 | Hottovy et al. |
| 6,262,191 B1 | 7/2001 | Hottovy et al. |
| 6,833,415 B2 | 12/2004 | Kendrick et al. |
| 6,867,278 B2 | 3/2005 | McDaniel et al. |
| 6,887,819 B2 | 5/2005 | McDaniel et al. |

FOREIGN PATENT DOCUMENTS

GB 1505818 3/1978

*Primary Examiner* — Ling Choi
*Assistant Examiner* — Sonya Wright
(74) *Attorney, Agent, or Firm* — Conley Rose, P.C.; Rodney B. Carroll; Cheryl L. Huseman (57) ABSTRACT

A method comprising contacting a support with a chromium-containing compound and a tin-containing compound to produce a catalyst precursor, and activating the catalyst precursor in a temperature range of from about 400° C. to about 700° C. to produce a polymerization catalyst. A method comprising contacting a support with a chromium-containing compound and a tin-containing compound to produce a catalyst precursor, activating the catalyst precursor in a temperature range of from about 400° C. to about 700° C. to produce a polymerization catalyst, and contacting the polymerization catalyst with ethylene in a reaction zone under suitable reaction conditions to form polyethylene wherein the molecular weight distribution of the polyethylene is broadened.

33 Claims, 2 Drawing Sheets

METHODS OF PREPARING A POLYMERIZATION CATALYST

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Technical Field

The present disclosure relates to catalyst compositions. More specifically, the present disclosure relates to methods of preparing polymerization catalyst compositions.

2. Background

Polymerization catalysts are known in the art, however methods of producing these catalysts may suffer from a variety of drawbacks. Enhancements in preparation methods for polymerization catalysts can reduce the costs associated with catalyst production and improve process economics. Thus, there is an ongoing need to develop new methods of preparing polymerization catalysts.

SUMMARY

Disclosed herein is a method comprising contacting a support with a chromium-containing compound and a tin-containing compound to produce a catalyst precursor, and activating the catalyst precursor in a temperature range of from about 400° C. to about 700° C. to produce a polymerization catalyst.

Further disclosed herein is a method comprising contacting a support with a chromium-containing compound and a tin-containing compound to produce a catalyst precursor, activating the catalyst precursor in a temperature range of from about 400° C. to about 700° C. to produce a polymerization catalyst, and contacting the polymerization catalyst with ethylene in a reaction zone under suitable reaction conditions to form polyethylene wherein the molecular weight distribution of the polyethylene is broadened.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are catalyst compositions comprising a support, chromium, and tin, and methods of making and using same. In an embodiment, a method of preparing a catalyst comprises contacting a support with a chromium-containing compound and a tin-containing compound. Such catalysts may function as polymerization catalysts. Hereinafter, such catalysts are termed tin-containing polymerization catalysts (TCPC). The TCPCs may display an increased polymerization activity and produce polymeric compositions having a broadened molecular weight distribution with increased low molecular weight components when compared to an otherwise similar catalyst lacking tin (e.g., Cr/Si catalyst). Additionally, the TCPCs may display a polymerization activity and produce polymeric compositions having a molecular weight distribution that is comparable to that observed when employing a chromium/silica/titania catalyst (i.e., Cr/Si/Ti catalyst).

In an embodiment, the TCPC comprises a support comprising silica. The support may contain greater than about 50 percent (%) silica, alternatively greater than about 75% silica, alternatively greater than about 90% silica by weight of the support. The support may have a surface area and pore volume effective to provide for an active catalyst. The surface area of the support may range from about 100 square meters per gram ($m^2/g$) to about 1,000 $m^2/g$, alternatively from about 200 $m^2/g$ to about 800 $m^2/g$, alternatively from about 250 $m^2/g$ to about 700 $m^2/g$. Further, the pore volume of the support may range from about 0.5 cubic centimeters per gram (cc/g) to about 3.5 cc/g, alternatively from about 0.8 cc/g to about 3 cc/g, or alternatively from about 1.0 cc/g to about 2.5 cc/g. The silica support may be prepared using any suitable method, for example the silica support may be prepared synthetically by hydrolyzing tetrachlorosilane ($SiCl_4$) with water or by contacting sodium silicate with a mineral acid. In an embodiment, the silica support may have a surface area ranging from about 100 $m^2/g$ to about 1000 $m^2/g$ and a pore volume ranging from about 0.1 cc/g to about 2.8 cc/g. An example of silica support suitable for use in this disclosure includes without limitation ES70 which is a silica support with a surface area of 300 $m^2/g$, and a pore volume of 1.6 cc/g that is commercially available from Inneos Co. The support may include additional components that do not adversely affect the TCPC, such as zirconia, alumina, thoria, magnesia, fluoride, sulfate, phosphate, or mixtures thereof.

In an embodiment, the support may be present in the TCPC in amounts of from about 50 wt. % to about 99 wt. % based on the final weight of the TCPC, alternatively from about 75 wt. % to about 99 wt. %, alternatively from about 90 wt. % to about 99 wt. %. Herein the final weight of the TCPC refers to the weight of the TCPC after all processing steps.

In an embodiment, the TCPC comprises chromium which may be introduced to the composition via contact of the support with at least one chromium-containing compound. The chromium-containing compound may be one or more compounds comprising chromium in the hexavalent oxidation state (hereinafter Cr(VI)) or comprising a material suitable for conversion to Cr(VI). In an embodiment, the chromium-containing compound comprises a water-soluble chromium-containing compound; alternatively the chromium-containing compound comprises a hydrocarbon-soluble chromium compound. The chromium-containing compound may be a chromium (II) compound, a chromium (III) compound, or combinations thereof.

Suitable chromium (III) compounds include, but are not limited to, chromium carboxylates, chromium naphthenates, chromium halides, chromium pyrrolides, chromium benzoates, chromium dionates, chromium nitrates, chromium sulfates, or combinations thereof. Specific chromium (III) compounds include, but are not limited to, chromium (III) isooctanoate, chromium (III) 2,2,6,6-tetramethylheptanedionate, chromium (III) naphthenate, chromium (III) chloride, chromium (III) tris(2-ethylhexanoate), chromic fluoride, chromium (III) oxy-2-ethylhexanoate, chromium (III) dichloroethylhexanoate, chromium (III) acetylacetonate, chromium (III) acetate, chromium (III) butyrate, chromium (III) neopentanoate, chromium (III) laurate, chromium (III) sulfate, chromium (III) oxalate, chromium (III) benzoate, chromium (III) pyrrolide(s), chromium (III) perchlorate, chromium (III) chlorate, or combinations thereof. Suitable chromium (II) compounds include, but are not limited to, chromous fluoride, chromous chloride, chromous bromide, chromous iodide, chromium (II) bis(2-ethylhexanoate), chromium (II) acetate, chromium (II) butyrate, chromium (II) neopentanoate, chromium (II) laurate, chromium (II) stearate, chromium (II) oxalate, chromium (II) benzoate, chromium (II) pyrrolide(s), chromous sulfate, or combinations thereof.

Examples of other suitable chromium-containing compounds include without limitation tertiary butyl chromate in a hydrocarbon liquid; chromium trioxide in water; chromium acetate in water; chromium nitrate in alcohol; zerovalent organochromium compounds such as pi bonded chromium complexes, for example, dicumene chromium and dibenzene chromium; or combinations thereof. Pi bonded chromium complexes are described in U.S. Pat. No. 3,976,632, which is incorporated by reference herein in its entirety.

In an embodiment, chromium may be present in the TCPC in amounts of from about 0.1 wt. % to about 10 wt. % based on the final weight of the TCPC, alternatively from about 0.2 wt. % to about 5 wt. %, alternatively from about 0.5 wt. % to about 2 wt. %.

In an embodiment, the TCPC comprises tin which may be introduced to the composition via contact of the support with at least one tin-containing compound. The tin-containing compound may be one or more compounds comprising tin in the tetravalent oxidation state (hereinafter Sn(IV)), or a material suitable for conversion to Sn(IV) such as tin in the divalent oxidation state (hereinafter Sn(II)). In an embodiment, the tin-containing compound is a water-soluble compound, alternatively the tin-containing compound is a hydrocarbon soluble compound. In another embodiment, the tin-containing compound may be a tin (IV) compound, tin (II) compound, or combinations thereof.

Suitable tin (IV) compounds include without limitation tin (IV) oxide; tin (IV) halides such as tin (IV) chloride, tin (IV) bromide, tin (IV) iodide; tetraalkoxytin such as tetramethoxytin, tetraethoxytin, tetrabutoxytin, tetraphenoxytin; tin (IV) sulfide; or combinations thereof. Suitable tin (II) compounds include without limitation tin (II) oxide; tin (II) halides such as tin (II) chloride, tin (II) bromide, tin (II) iodide; dialkoxytin (II) halide such as dimethoxytin dichloride, diethoxytin dichloride, dibutoxytin dichloride, diphenoxytin dichloride, diethoxytin dibromide; tin (II) sulfate; tin (II) selenide; tin (II) telluride; or combinations thereof.

Examples of other suitable tin-containing compounds include tin peroxide; stannic anhydride; alkoxytin trihalides such as methoxytin trichloride, ethoxytin trichloride, butoxytin trichloride, phenoxytin trichloride, ethoxytin tribromide; trialkoxytin halide compounds such as trimethoxytin chloride, triethoxytin chloride, tributoxytin chloride, triphenoxytin chloride, triethoxytin bromide; tributylin, tributylin oxide; triphenyltin hydride; stannate compounds containing the $SnO_3^{2-}$ or $Sn(OH)_6^{2-}$ ion such as $Na_2SnO_3$, $Na_2SnO_3 \cdot 3H_2O$; stannous hydroxide ($Sn(OH)_2$); stannic acid (stannic hydroxide $Sn(OH)_4$); tin alkoxides; tin amides; tin nitrite; tin oxalate; alkyl tinates; or combinations thereof.

In an embodiment, tin may be present in the TCPC in amounts of from about 0.5 wt. % to about 25 wt. % based on the final weight of the TCPC, alternatively from about 1 wt. % to about 15 wt. %, or from about 2 wt. % to about 10 wt. %.

In an embodiment, a method of preparing a TCPC comprises contacting a support (e.g., silica), one or more chromium-containing compounds, and one or more tin-containing compounds. The contacting of the catalyst components may be carried out simultaneously or separately in any order desired by the user and compatible with the process. The chromium-containing compound may be contacted with the support via any suitable method such as for example via ion-exchange, incipient wetness, pore fill, aqueous impregnation, organic solvent impregnation, melt coating, cogelation, or the like. The tin-containing compound may be contacted with the support via any suitable method such as for example via cogelation, coating, vapor deposition, or the like.

In an embodiment, a method of preparing a TCPC comprises contacting a support (e.g., silica) with one or more tin-containing compounds to form a Sn/Si mixture, followed by contacting the Sn/Si mixture with one or more chromium-containing compounds to form a precursor TCPC (i.e., Sn/Si/Cr mixture), which may be further treated and activated as described later herein.

In an embodiment, tin may be contacted with a silica support via cogelation wherein the silica and tin are coprecipitated. For example, a tin-containing compound may first be contacted with a mineral acid (e.g., hydrochloric acid, acetic acid, sulfuric acid, etc.) to form a tin-containing acid. The method of forming the TCPC may further comprise introducing an alkali metal silicate (e.g., sodium silicate) into the acid containing the tin compound to form a hydrogel and then aging the hydrogel for an appropriate time period to produce an aged Sn/Si hydrogel. The aged Sn/Si hydrogel may be further washed by contacting with a water soluble organic compound (e.g., an alcohol) to produce a mixture of an alkali metal free Sn/Si hydrogel and a water soluble organic compound. The method may further comprise separating the alkali metal free Sn/Si hydrogel from the water soluble organic compound to form a Sn/Si xerogel.

A precursor TCPC may be formed by contacting the Sn/Si xerogel with one or more chromium-containing compounds of the type previously described herein. The chromium containing compound may be in an aqueous or organic solution or a vapor which is incorporated in the TCPC using any suitable method. For example, the chromium may be incorporated into the TCPC by impregnation of the Sn/Si xerogel to incipient wetness; through formation of a slurry with the chromium containing compound and Sn/Si xerogel; or by vapor deposition of the chromium containing compound onto the Sn/Si xerogel. In an embodiment, the chromium containing compound is in an aqueous or organic solution and is contacted with the Sn/Si xerogel in a temperature range of from about 0° C. to about 200° C., alternatively from about 10° C. to about 190° C., alternatively from about 25° C. to about 150° C. In an alternative embodiment, the chromium containing compound is incorporated into the Sn/Si xerogel by vapor deposition in a temperature range of from about 0° C. to about 500° C., alternatively from about 10° C. to about 490° C., alternatively from about 25° C. to about 450° C. The resultant composition may then be dried using any suitable means (e.g., spray drying, flash drying, oven drying, vacuum drying, rotoevaporation, etc.) in a temperature range of from about 0° C. to about 200° C., alternatively from about 10° C. to about 190° C., alternatively from about 25° C. to about 150° C.

In another embodiment, tin may be introduced to the silica support via the application of a tin coating onto the support. The tin coating may be prepared by applying a mixture containing a tin-compound suspended or dissolved in a suitable solvent onto the support. A solvent as defined herein is a substance, usually but not limited to a liquid, capable of dissolving or suspending another substance. Suitable solvents include without limitation alcohols, alkanes, ketones, esters, dibasic esters, or combinations thereof. The solvent may be methanol, ethanol, 1-propanol, 1-butanol, 1-pentanol, 2-methyl-1-propanol, neopentyl alcohol, isopropyl alcohol, propanol, 2-butanol, butanediols, pentane, hexane, cyclohexane, heptane, methylethyl ketone, any combination thereof, or any other solvent described herein A precursor TCPC may be formed by contacting the Sn coated silica with one or more chromium-containing compounds of the type previously described herein. The chromium containing compound may be contacted with the Sn coated silica for a time period of from about 1 minute to about 24 hours, alternatively from about 5 minutes to about 12 hours, alternatively from about 1 hour to about 5 hours. The chromium containing compound may be an aqueous or organic solution or a vapor which is incorporated in the TCPC using any suitable method. For example, the chromium may be incorporated into the TCPC by impregnation of the Sn coated silica to incipient wetness; through formation of a slurry with the chromium containing compound and Sn coated silica; or by vapor deposition of the chromium containing compound onto the Sn coated silica. In an embodiment, the chromium containing compound is in an aqueous or organic solution and is contacted with the Sn coated silica in a temperature range of from about 0° C. to about 200° C., alternatively from about 10° C. to about 190° C., alternatively from about 25° C. to about 150° C. In an alternative embodiment, the chromium containing compound is incorporated into the Sn coated silica by vapor deposition in a temperature range of from about 0° C. to about 500° C., alternatively from about 10° C. to about 490° C., alternatively from about 25° C. to about 450° C. The resultant composition may then be dried using any suitable means (e.g., spray drying, flash drying, oven drying, vacuum drying, rotoevaporation, etc.) in a temperature range of from about 0° C. to about 200° C., alternatively from about 10° C. to about 190° C., alternatively from about 25° C. to about 150° C.

In another embodiment, tin may be introduced to the silica support via the impregnation of the silica support with a solution comprising the tin-containing compound. For example, the silica support may be aqueously impregnated with a water soluble tin-containing compound such as tin(IV) chloride to form an Sn/Si mixture. Alternatively, the silica support may be impregnated with a hydrocarbon-soluble tin-containing compound to form the Sn/Si mixture. The Sn/Si mixture may be further contacted with one or more chromium-containing compounds to form a precursor TCPC as described previously herein.

Alternatively, a method of preparing a TCPC comprises contacting a support (i.e., silica) with a chromium-containing compound of the type previously described herein to form a Cr/Si mixture. The Cr/Si mixture may then be contacted a tin-containing compound via vapor deposition of the tin-containing compound onto the Cr/Si mixture to form a precursor TCPC. For example, the tin-containing compound may comprise a volatile tin compound such as stannous chloride which can then mix with a carrier gas such as for example nitrogen, and/or air. The carrier gas comprising the tin-containing compound may then be contacted with the Cr/Si mixture under suitable conditions to allow for the deposition of tin onto the Cr/Si mixture to form a precursor TCPC.

In an embodiment, a precursor TCPC may be activated to produce a TCPC. Activation of the precursor TCPC comprises heating the precursor TCPC in the temperature range of from about 200° C. to about 1000° C., alternatively from about 250° C. to about 900° C., alternatively from about 250° C. to about 700° C. Activation of the precursor TCPC may be carried out in an oxidizing e.g., air), reducing (e.g., carbon monoxide), or inert (nitrogen) atmosphere. In an embodiment, at least a portion of the activation of the TCPC occurs in an oxidizing atmosphere such as in the presence of air or oxygen at a temperature of equal to or less than about 700° C., alternatively of from about 400° C. to about 700° C., alternatively from about 400° C. to about 650° C., alternatively from about 400° C. to about 550° C., alternatively at about 500° C., for a time period of from about 1 min to about 10 hours, or from about 20 min to about 5 hours, or from about 1 hour to about 3 hours.

In an embodiment, activation of the precursor TCPC may occur by sequential heating or heating in multiple stages in differing atmospheres. For example, the sequential heating may comprise heating in three stages having a first stage at a temperature of from about 700° C. to about 900° C. in carbon monoxide for a time period of from about 1 hour to about 10 hours, followed by a second stage at a temperature of from about 500° C. to about 900° C. in nitrogen for a time period of from about 10 min. to about 5 hours, followed by a third stage at a temperature of from about 550° C. to about 700° C. in air for a time period of from about 1 hr to about 10 hrs. The resulting material is a TCPC which may function as a polymerization catalyst when employed in a polymerization reaction system.

In an embodiment, the TCPC comprises Sn(IV). Sn(IV) may have been incorporated into the TCPC using a tin containing compound comprising Sn in the tetravalent oxidation state. Alternatively, Sn(IV) may have been incorporated into the TCPC using a tin containing compound in the divalent oxidation state which was subsequently oxidized to the tetravalent oxidation state upon heating in an oxidizing atmosphere as described previously herein. Without wishing to be limited by theory, tin in the tetravalent oxidation state displays a number of similarities to titanium in the tetravalent oxidation state Ti(IV). Ti(IV) is known to promote the polymerization activity of Cr/Si catalysts and to form polymers having an increased number of low molecular weight components. Sn(IV) has a similar reactivity and size to Ti(IV). Further, Sn(IV) forms halide complexes (e.g., $SnCl_4$) that are isomorphous to the halide complexes formed by Ti(IV). Without wishing to be limited by theory, it is believed that both tin and titanium incorporated into or onto the silica lattice generates Bronsted acidity which when attached to chromium withdraws electrons from the active site, making it more likely to beta-H eliminate, thus functioning as a polymerization catalyst.

The catalysts (i.e., TCPCs) of the present disclosure are intended for any olefin polymerization method using various types of polymerization reactors. As used herein, "polymerization reactor" includes any polymerization reactor capable of polymerizing olefin monomers to produce homopolymers or copolymers. Such homopolymers and copolymers are referred to as resins or polymers. The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present disclosure may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the disclosure, the polymerization reactor system may comprise at least one loop slurry reactor comprising vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process), is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4588,790 and 5,436,304, each of which is incorporated by reference in its entirety herein.

According to still another aspect of the disclosure, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the disclosure, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200 to 500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, crack growth, long chain branching and rheological measurements.

The concentrations of monomer, co-monomer, hydrogen, co-catalyst, modifiers, and electron donors are important in producing these resin properties. Comonomer is used to control product density. Hydrogen can be used to control product molecular weight. Co-catalysts can be used to alkylate, scavenge poisons and control molecular weight. In addition, the concentration of poisons is minimized because poisons impact the reactions and product properties.

The polymer or resin may be formed into various articles, including, but not limited to, bottles, drums, toys, household containers, utensils, film products, drums, fuel tanks, pipes, geomembranes, and liners. Various processes may be used to form these articles, including, but not limited to, blow molding, extrusion molding, rotational molding, thermoforming, cast molding and the like. After polymerization, additives and modifiers can be added to the polymer to provide better processing during manufacturing and for desired properties in the end product. Additives include surface modifiers such as slip agents, antiblocks, tackifiers; pigments; processing aids such as waxes/oils and fluoroelastomers; and special additives such as fire retardants, antistats, scavengers, absorbers, odor enhancers, and degradation agents.

The TCPC prepared in accordance with the present disclosure may be used for the polymerization of olefins, for example, alpha-olefins. In an embodiment, a TCPC is contacted with one or more olefins in a reaction zone under suitable reaction conditions (e.g., temperature, pressure, etc.) to polymerize the olefins. Linear or branched alpha-olefins having 2 to 30 carbon atoms can be used as the olefins raw material. Specific examples of the alpha-olefins may include ethylene, propylene, 1-butene, 1-hexene, 1-octene, 3-methyl-1-butene, 4-methyl-1-pentene or the like.

TCPCs of the type disclosed herein may have an increased polymerization activity when compared to an otherwise similar catalyst lacking tin (e.g., a Cr/Si catalyst). Additionally, TCPCs of the type disclosed herein may have a comparable polymerization activity when compared to a chromium/silica/titania (Cr/Si/Ti) catalyst. In an embodiment, the TCPC has a polymerization activity of from about 100 grams of polymer per grams of catalyst per hour (g/g-h) to about 10,000 g/g-h, alternatively from about 1000 g/g-h to about 7000 g/g-h, alternatively from about 1500 g/g-h to about 5000 g/g-h.

TCPCs of the type described herein may be used for the production of a polymeric composition having improved properties when compared to a polymeric composition produced using an otherwise similar polymerization catalyst lacking tin (e.g., a Cr/Si catalyst). Alternatively, TCPCs of the type described herein may produce a polymeric composition having properties comparable to a polymeric composition produced using a Cr/Si/Ti catalyst. In an embodiment, the polymeric composition comprises an ethylene polymer, alternatively a polyethylene homopolymer (PE homopolymer). In an alternative embodiment, the polymeric composition comprises a polyethylene copolymer comprising less than about 10 mol % comonomer, alternatively less than about 7 mol % comonomer, alternatively less than about 4 mol % comonomer.

The molecular weight distribution (MWD) of the PE composition may be characterized by the ratio of the weight average molecular weight to the number average molecular weight, which is also referred to as the polydispersity index (PDI) or more simply as polydispersity. The number average molecular weight ($M_n$) is the common average of the molecular weights of the individual polymers calculated by measuring the molecular weight of n polymer molecules, summing the weights, and dividing by n. The weight average molecular weight ($M_w$) of a polymer composition is calculated according to equation 1:

$$M_w = \frac{\sum_i n_i M_i^2}{\sum_i n_i M_i} \quad (1)$$

where $n_i$ is the number of molecules of molecular weight $M_i$. All molecular weight averages are expressed in gram per mole (g/mol). Various moments of the MWD include $M_n$, $M_w$, $M_z$, and $M_v$. The PE composition may have a broad MWD of equal to or greater than about 25 polydispersity ($M_w/M_n$), alternatively greater than about 30, or alternatively greater than about 40.

A TCPC of the type described herein may produce a polymeric composition (e.g., polyethylene) having a reduced weight average molecular weight when compared to a polymeric composition produced using an otherwise similar catalyst lacking tin (e.g., a Cr/Si catalyst). The weight average molecular weight of a polymeric composition produced using a TCPC of the type described herein may be reduced by equal to or greater than about 10%, alternatively equal to or greater than about 15%, alternatively equal to or greater than about 20% when compared to a polymeric composition produced using an otherwise similar catalyst lacking tin. In an embodiment, a polymeric composition (e.g., polyethylene) produced using a TCPC may have a weight average molecular weight of from about 75,000 Daltons to about 1,000,000 Daltons, alternatively from about 100,000 Daltons to about 500,000 Daltons, alternatively from about 150,000 Daltons to about 350,000 Daltons. The overall decrease in the weight average molecular weight of the polymeric composition (e.g., polyethylene) produced using a TCPC of the type described herein may be attributed to an increase in the amount of low molecular weight components (LMWC) in the composition with a concomitant decrease in the amount of high molecular weight components (HMWC) when compared to an otherwise similar composition prepared using a Cr/silica catalyst. The extent to which the amounts of LMWC and HMWC are altered may be adjusted to meet a user-desired range by adjusting the reactions conditions. Such adjustments may be made by one of ordinary skill in the art with the aid of this disclosure.

In an embodiment, a polymeric composition (e.g., polyethylene) produced using a TCPC of the type described herein has an increase of greater than about 25%, alternatively greater than about 40%, alternatively greater than about 60% in the amount of LMWCs having an average molecular weight of equal to or less than about 10,000 Daltons.

Alternatively, the polymeric composition (e.g., polyethylene) produced using a TCPC of the type described herein may have a decrease of greater than about 5%, alternatively greater than about 10%, alternatively greater than about 15% in the amount of HMWCs having an average molecular weight of equal to or greater than about 100,000 Daltons.

A TCPC may allow for the production of polymers with an increased melt index (MI) and high load melt index (HLMI) when compared to polymers produced using an otherwise similar polymerization catalyst lacking tin (e.g., a Cr/Si catalyst). The melt index of a polymer resin represents the rate of flow of a molten resin through an orifice of 0.0825 inch diameter when subjected to a force of 2,160 grams at 190° C. Further, the high load melt index of a polymer resin represents the rate of flow of a molten resin through an orifice of 0.0825 inch diameter when subjected to a force of 21,600 grams at 190° C. The MI values of a polymer resin (e.g., polyethylene) produced using a TCPC of the type described herein may be in a range of from about 0.01 g/10 min to about 10 g/10 min, alternatively from about 0.1 to about 1 g/10 min. The HLMI values of a polymer resin (e.g., polyethylene) produced using a TCPC of the type described herein may be in a range of from about 1 g/10 min to about 1000 g/10 min, alternatively from about 10 to about 100 g/10 min. The MI and HLMI values may be determined in accordance with ASTM D1238. In an embodiment, a polymeric composition prepared using a Cr/Sn/Si catalyst has an HLMI that is about two times greater than an otherwise similar composition prepared using a Cr/Si catalyst, alternatively about three times greater, alternatively about five times greater.

In an embodiment, a polymer (e.g., polyethylene) produced by TCPCs of this disclosure has a reduced yellowness when compared to an otherwise similar polymer prepared using a Cr/Si/Ti catalyst. Without wishing to be limited by theory, the polymer produced using a Cr/Si/Ti catalyst has a degree of yellow coloring that is attributable at least in part to the formation of Ti transition metal complexes with common polymer additives such as antioxidants. Given that the TCPCs do not contain Ti, the formation of these undesirable Ti transition metal complexes is eliminated. Furthermore, resins prepared from the TCPC may substantially reduce or forgo the use of phosphite additives that are commonly used to decrease yellowness (e.g., Ti transition metal complexes) in resins produced with Cr/Si/Ti catalysts. The ability to produce polymers having a user desired color in the absence of such additives may result in an improvement in the overall process economics. Examples of phosphite additives include without limitation IRGANOX additives which are commercially available from Ciba Specialty Chemicals and DOVERPHOS additives which are commercially available from ICC Industries—Dover. In an embodiment, a TCPC of the type described herein may be used to form a polymer (e.g., polyethylene) that is substantially free of phosphite additives.

Furthermore, polymers (e.g., polyethylene) produced using TCPCs of the type described herein may display a reduced degree of degradation during processing (e.g., extrusion, regrinding) in comparison to resins produced with Cr/Si/Ti catalysts. Without wishing to be limited by theory, polymer degradation during processing is attributable to oxidative reactions that may be catalyzed by Ti catalysts. TCPCs which are poor oxidation catalysts may reduce the oxidation reactions that result in polymer degradation and thereby improve the stability of the polymer.

In an embodiment, polyethylene homopolymers and copolymers of ethylene with other mono-olefins are produced in the manner described above using the catalyst (i.e., TCPC) prepared as described herein. Polymer resins produced as disclosed herein may be formed into articles of manufacture or end use articles using techniques such as extrusion, blow molding, injection molding, fiber spinning, thermoforming, and casting. The TCPCs disclosed herein may also be used to form polymers such as polyolefins and PE-100 pipes having both small diameter (1 inch to 12 inches in diameter) and large diameter (greater than 12 inches in diameter). PE-100 pipe is described in U.S. Patent Application Pub. No. 2003/0199648 A1, which is incorporated herein by reference in its entirety. In an embodiment, the TCPCs disclosed herein are used to form a high melt index polymeric resin such as a tailored resin (TR). Examples of TRs include without limitation film (e.g., TR130, TR144, etc), pipe (e.g., TR480, TR418, etc), blow molding (e.g., TR570, TR512, etc), raffia (i.e. TR147, etc), all of which are commercially available from Chevron Phillips Chemical Company, LLC.

The TCPCs prepared as described herein result in an overall improvement in process economics. For example, the TCPC may be prepared by using low cost aqueous impregnation of a water soluble tin-containing compound to a support. In an embodiment, a method of preparing a TCPC comprises impregnating a silica support with an aqueous solution comprising a tin-containing compound of the type described herein to form a first composition. The first composition may then be contacted with a chromium containing compound of the type described herein to form a precursor TCPC. The precursor TCPC may then be oxidized by calcining at a temperature of equal to or less than about 700° C. as described previously.

EXAMPLES

The disclosure having been generally described, the following examples are given as particular embodiments of the disclosure and to demonstrate the practice and advantages thereof. It is understood that the examples are given by way of illustration and are not intended to limit the specification of the claims to follow in any manner.

Melt index (MI, g/10 min) was determined in accordance with ASTM D1238 at 190° C. with a 2,160 gram weight. High load melt index (HLMI, g/10 min) was determined in accordance with ASTM D1238 at 190° C. with a 21,600 gram weight. A "Quantachrome Autosorb-6 Nitrogen Pore Size Distribution Instrument" was used to determined specific surface area ("surface area") and specific pore volume ("pore volume"). This instrument was acquired from the Quantachrome Corporation, Syosset, N.Y. Molecular weights and molecular weight distributions were obtained using a PL 220 SEC high temperature chromatography unit (Polymer Laboratories) with trichlorobenzene (TCB) as the solvent, with a flow rate of 1 mL/minute at a temperature of 145° C. BHT (2,6-di-tert-butyl-4-methylphenol) at a concentration of 0.5 g/L was used as a stabilizer in the TCB. An injection volume of 200 μL was used with a nominal polymer concentration of 1.5 mg/mL. Dissolution of the sample in stabilized TCB was carried out by heating at 150° C. for 5 hours with occasional, gentle agitation. The columns used were three PL gel Mixed A LS columns (7.8×300 mm) and were calibrated with a broad linear polyethylene standard (Phillips Marlex® BHB 5003) for which the molecular weight had been determined.

COMPARATIVE EXAMPLE

Cr/Si catalysts were prepared by impregnating a silica support to incipient wetness with 5 wt % Cr as an aqueous $CrO_3$ solution. The silica support was HA30 silica which is commercially available from W.R. Grace Corporation and has an average particle size of 90 μm, a surface area of 500 $m^2/g$, and a pore volume of 1.6 cc/g. The solution was then stir-dried by evaporation at room temperature until free flowing. A portion of the Cr/Si catalyst was designated Sample 1, and precalcined at 250° C. to remove any remaining water and then activated by calcining at 550° C.

Three samples of Cr/Si/Ti catalysts, designated Samples 2-4, were prepared by treating a Cr/Si catalyst after precalcining at 250° C., with a Ti alkoxide in heptane solution with a titanium loading of 2 wt. %, 3 wt. %, and 6 wt. % respectively. The Ti alkoxide was Ti(VI) tetra-isopropoxide which is commercially available from Aldrich.

All samples were calcined at 550° C. and used to produce polyethylene in a bench reactor at 85° C. with a feedstock comprising 50 ml hexene and 550 psi ethylene. Polymerization was allowed to continue for about 60 minutes.

Figure 1:
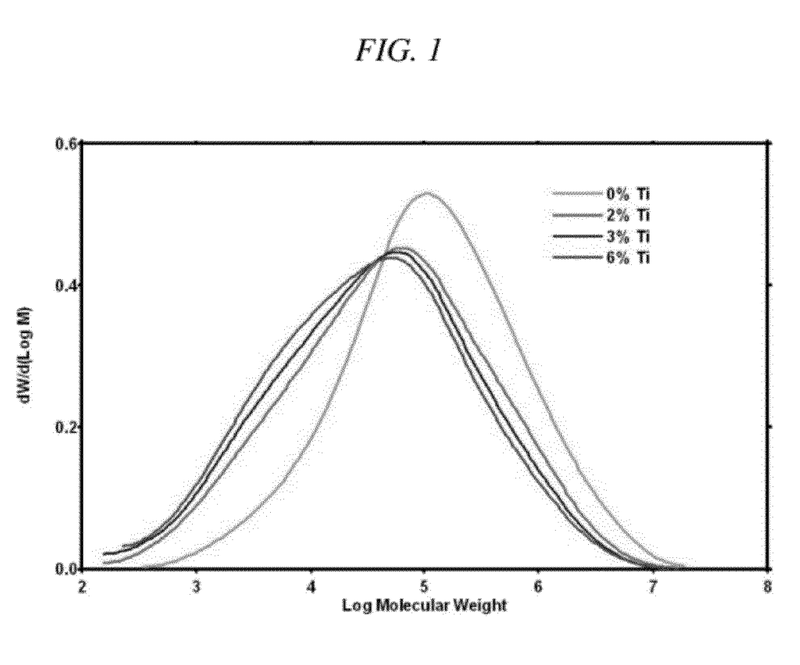
FIG. 1 is a plot of dW/d(Log M) as a function of log molecular weight for the samples from the comparative example.

The resulting polymers were analyzed by gel permeation chromatography (GPC). FIG. 1 is a GPC curve illustrating the molecular weight distribution of the polymers produced from catalyst Samples 1-4 where dW/d(LogM) was plotted as a function of log molecular weight. Referring to FIG. 1, the lower molecular weight side of the distribution has been reformed by the presence of 2 wt. %, 3 wt. %, and 6 wt. % titanium in the samples prepared using Cr/Si/Ti catalysts.

Example 1

The effect of adding tin to a chromium supported silica (Cr/Si) catalyst was investigated. Cr/Si catalysts were prepared as described in the comparative example. A portion of the Cr/Si catalyst, designated Sample 5, was precalcined at 250° C. to remove any remaining water and then activated by calcining at 500° C.

A Cr/Si/Sn catalyst, designated Sample 6, was prepared via chemical vapor deposition. The tin-containing compound was tin (IV) chloride, which is widely commercially available. Silica was placed in an activator tube and heated to 200° C. Then 3 mmol/g of tin (IV) chloride was injected underneath the activator tube during heating of the silica support. As nitrogen passed through the tin (IV) chloride, it evaporated, and was carried by nitrogen to the silica support where it was incorporated. The tin containing support was then calcined in air for three hours at 500° C. in order to burn off residual chloride. Then 1 wt. % Cr was impregnated onto the calcined tin containing support as chromium (III) acetylacetonate in toluene at room temperature. After evaporation, the final catalyst was calcined again in air for 3 hours at 500° C. It had an orange color.

Figure 2:
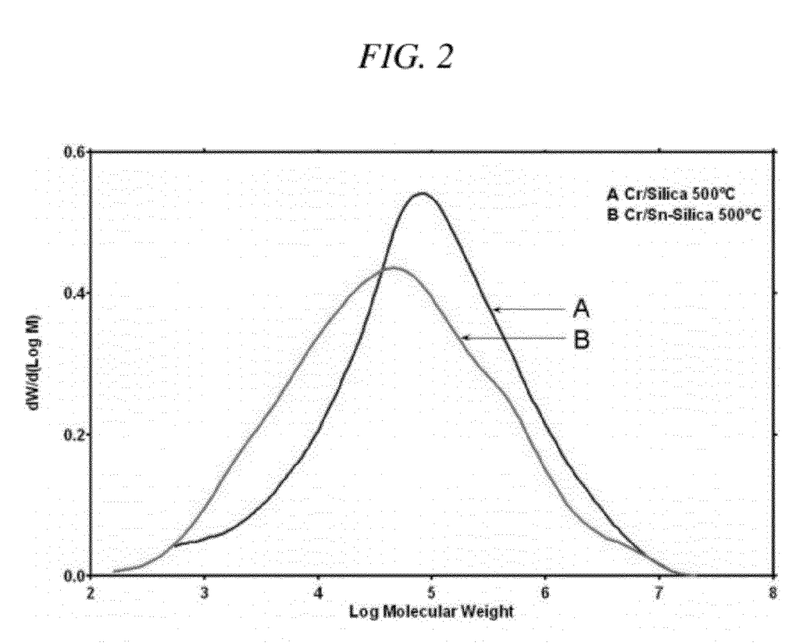
FIG. 2 is a plot of dW/d(Log M) as a function of log molecular weight for the samples from Example 1.

Each catalyst sample was then used to polymerize polyethylene in a bench reactor at 105° C., 150 psi $H_2$, and 550 psi ethylene. A sample of the polymer formed using the Cr/Si/Sn catalyst was removed after polymerization for about 60 minutes. The resulting polymers were analyzed by gel permeation chromatography (GPC). FIG. 2 is a GPC curve illustrating the molecular weight distribution of the polymers produced from either the Cr/Si catalyst (Sample 5) or the Cr/Sn/Si catalyst (Sample 6) where dW/d(LogM) was plotted as a function of log molecular weight. Referring to FIG. 2, the lower molecular weight side of the distribution has been reformed by the presence of tin in the Cr/Si/Sn curve.

As can also be seen in FIG. 2, the Cr/Sn/Si curve intercepted the Cr/Si curve at a molecular weight of about 40,000 Daltons. The interception point suggests that the Cr/Sn/Si may increase the number of polymers with a molecular weight of less than about 40,000 Daltons. The percentage difference in the amounts of polymers produced between Cr/Si (Sample 5) and Cr/Sn/Si (Sample 6) at the indicated molecular weights were calculated and the results are presented in Table 1.

TABLE 1

| Sample | Molecular Weight | Increase/Decrease | Percentage Difference |
|---|---|---|---|
| 6 versus 5 | Less than 10,000 | Increase | ~70% |
| 6 versus 5 | Greater than 100,000 | Decrease | ~20% |

Further analysis of FIG. 2 and Table 1 demonstrated that the average molecular weight of polymers produced with the Cr/Sn/Si catalyst was lower when compared to the average molecular weight of polymers produced with Cr/Si catalysts.

Additionally, FIG. 2 was compared to FIG. 1 to compare the effect of adding tin versus titania to a Cr/Si catalysts. Referring to FIG. 2, tin appears to broaden the molecular weight distribution on the low molecular weight side similar to the effect of incorporating titania into the Cr/Si catalyst.

Samples 7-11 were polymer samples prepared using either a Cr/Si/Sn catalyst or a Cr/Si catalyst as indicated in Table 2. The MI, HLMI and molecular weights of the samples are also presented in Table 2. The HLMI of polyethylene samples prepared using a Cr/Si/Sn catalyst (Samples 7-9) were observed to increase when compared to otherwise similar samples prepared using a Cr/Si catalyst (Samples 10-11). Additionally, the number average molecular weight ($M_n$) and weight average molecular weight ($M_w$) were shown to decrease for samples prepared using a Cr/Si/Sn catalyst (Samples 7-9), when compared to samples prepared using a Cr/Si catalyst (Sample 10-11).

TABLE 2

| Sample No. | Catalyst | MI (g/10 min.) | HLMI (g/10 min.) | $M_n$/1000 (Daltons) | $M_w$/1000 (Daltons) | $M_z$/1000 (Daltons) | $M_w/M_n$ |
|---|---|---|---|---|---|---|---|
| 7 | Cr/Si/Sn | 0.12 | 19.5 | 9.6 | 311 | 3480 | 32 |
| 8 | Cr/Si/Sn | 0.06 | 9.1 | 11.5 | 343 | 3029 | 30 |
| 9 | Cr/Si/Sn | 0.12 | 18.2 | 4.8 | 261 | 2970 | 54 |
| 10 | Cr/Si | 0 | 1.6 | 16.1 | 414 | 2908 | 26 |
| 11 | Cr/Si | 0 | 4.7 | 16.6 | 367 | 2952 | 22 |

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ... , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method comprising:
   contacting a support with a chromium-containing compound and a tin-containing compound individually to produce a catalyst precursor, and
   activating the catalyst precursor in a temperature range of from about 400° C. to about 700° C. to produce a polymerization catalyst, wherein the polymerization catalyst comprises from about 0.1 wt. % to about 10 wt. % chromium by final weight of the polymerization catalyst.

2. The method of claim 1 wherein the tin-containing compound comprises a water-soluble compound, a tin (IV) compound, a material suitable for conversion to tin (IV), or combinations thereof.

3. The method of claim 1 wherein the tin-containing compound comprises tin (IV) oxide, tin (IV) chloride, tin (IV) bromide, tin (IV) iodide, tetramethoxytin, tetraethoxytin, tetrabutoxytin, tetraphenoxytin; tin (IV) sulfide, -tin (II) oxide, tin (II) chloride, tin (II) bromide, tin (II) iodide, -dimethoxytin dichloride, diethoxytin dichloride, dibutoxytin dichloride, diphenoxytin dichloride, diethoxytin dibromide, tin (II) sulfate, tin (II) selenide, tin (II) telluride, stannic oxide, tin peroxide, stannic anhydride, methoxytin trichloride, ethoxytin trichloride, butoxytin trichloride, phenoxytin trichloride, ethoxytin tribromide; trimethoxytin chloride, triethoxytin chloride, tributoxytin chloride, triphenoxytin chloride, triethoxytin bromide, tributyltin, tributyltin oxide, triphenyltin hydride, $Na_2SnO_3$, $Na_2SnO_3 \cdot 3H_2O$, stannous hydroxide (Sn(OH)$_2$), stannic acid, stannic hydroxide, tin nitrite, tin oxalate, or combinations thereof.

4. The method of claim 1 wherein the polymerization catalyst comprises from about 0.5 wt. % to about 25 wt. % tin by final weight of the polymerization catalyst.

5. The method of claim 1 wherein the support comprises silica.

6. The method of claim 1 wherein the support has a surface area in a range of from about 100 m$^2$/g to about 1000 m$^2$/g.

7. The method of claim 1 wherein the support has a pore volume in a range of from about 0.5 cc/g to about 3.5 cc/g.

8. The method of claim 1 wherein the polymerization catalyst comprises from about 50 wt. % to about 99 wt. % support by final weight of the polymerization catalyst.

9. The method of claim 1 wherein the chromium-containing compound comprises a water-soluble chromium compound, a hydrocarbon-soluble chromium compound, chromium trioxide, a chromium (III) compound, chromium carboxylates, chromium naphthenates, chromium halides, chromium pyrrolides, chromium benzoates, chromium dionates, chromium nitrates, chromium sulfates, zerovalent organochromium compounds, pi bonded chromium complexes, or combinations thereof.

10. The method of claim 1 wherein the contacting of the tin-containing compound with the support comprises cogelation, coating, impregnation, aqueous impregnation, chemical vapor deposition, or combinations thereof.

11. The method of claim 1 wherein the contacting of the chromium-containing compound with the support comprises ion-exchange, incipient wetness, pore fill, aqueous impregnation, organic solvent impregnation, melt coating, cogelation, or combinations thereof.

12. The method of claim 1 wherein the polymerization catalyst has a polymerization activity of from about 100 g/g-h to about 10,000 g/g-h.

13. A method comprising:
   contacting a support with a chromium-containing compound and a tin-containing compound individually to produce a catalyst precursor;
   activating the catalyst precursor in a temperature range of from about 400° C. to about 700° C. to produce a polymerization catalyst, wherein the polymerization catalyst comprises from about 0.1 wt. % to about 10 wt. % chromium by final weight of the polymerization catalyst;
   contacting the polymerization catalyst with one or more olefin monomers in a reaction zone under suitable reaction conditions to form a polymer; and
   recovering the polymer from the reaction zone, wherein the chromium containing compound comprises a water-soluble chromium compound, and the tin-containing compound comprises a tin (IV) compound.

14. The method of claim 13 wherein the olefin monomers comprise ethylene and the polymer comprises an ethylene homopolymer; the olefin monomers comprise ethylene and another alpha olefin monomer and the polymer comprises an ethylene copolymer; or combinations thereof.

15. The method of claim 13 wherein the polymer has a high load melt index of from about 1 g/10 min to about 1000 g/10 min.

16. The method of claim 13 wherein the polymer has a melt index of from about 0.01 g/10 min, to about 10 g/10 min.

17. The method of claim 13 wherein the polymer has a weight average molecular weight of from about 75,000 Daltons to about 1,000,000 Daltons.

18. The method of claim 13 wherein the polymer has an increase of greater than about 25% in the amount of low molecular weight components having an average molecular weight of equal to or less than about 10,000 Daltons when compared to an otherwise similar composition prepared in the absence of a tin.

19. The method of claim 13 wherein the polymer has a decrease of equal to or greater than about 10% in the weight average molecular weight of the composition when compared to an otherwise similar composition prepared in the absence of a tin.

20. The method of claim 13 wherein the polymer has an increase in the high load melt index is about two times greater than an otherwise similar composition prepared in the absence of a tin.

21. The method of claim 13 wherein the polymer has a reduced yellowness when compared to an otherwise similar polymer prepared using a chromium-silica-titania catalyst.

22. The method of claim 13 wherein the polymer has an increased stability when compared to an otherwise similar polymer prepared using a chromium-silica-titania catalyst.

23. The method of claim 1 wherein the tin-containing compound comprises a tin (IV) halide, tetraalkoxytin, alkoxytin trihalide, trialkoxytin halide, or combinations thereof.

24. The method of claim 1 wherein the tin-containing compound comprises a tin(IV) compound.

25. The method of claim 1 wherein the chromium-containing compound comprises a water-soluble chromium compound.

26. The method of claim 1 wherein the catalyst is activated at a temperature of from about 400° C. to about 650° C.

27. The method of claim 24 wherein the chromium-containing compound comprises a water-soluble chromium compound.

28. The method of claim 24 wherein the catalyst is activated at a temperature of from about 400° C. to about 650° C.

29. The method of claim 25 wherein the catalyst is activated at a temperature of from about 400° C. to about 650° C.

30. The method of claim 27 wherein the catalyst is activated at a temperature of from about 400° C. to about 650° C.

31. The method of claim 1 wherein the tin-containing compound comprises a tin (II) compound, a dialkoxytin (IV) halide, a stannate compound $SnO_3^{2-}$ or $Sn(OH)_6^{2-}$ ion, a tin alkoxide, a tin amide, an alkyl tinate, or combinations or thereof.

32. The method of claim 1 wherein the chromium-containing compound comprises tertiary butyl chromate, biscyclopentadienyl chromium(II), chromium (III) acetylacetonate, chromous fluoride, chromous chloride, chromous bromide, chromous iodide, chromium (II) bis(2-ethylhexanoate), chromium (II) acetate, chromium (II) butyrate, chromium (II) neopentanoate, chromium (II) laurate, chromium (II) stearate, chromium (II) oxalate, chromium (II) benzoate, chromium (II) pyrrolide(s), chromous sulfate, chromium (III) isooctanoate, chromium (III) 2,2,6,6-tetramethylheptanedionate, chromium (III) naphthenate, chromium (III) chloride, chromium (III) tris(2-ethylhexanoate), chromium (III) oxy-2-ethylhexanoate, chromium (III) dichloroethylhexanoate, chromium (III) acetate, chromium (III) butyrate, chromium (III) neopentanoate, chromium (III) laurate, chromium (III) sulfate, chromium (III) oxalate, chromium (III) benzoate, chromium (III) pyrrolide(s), chromium (III) perchlorate, chromium (III) chlorate, tertiary butyl chromate in a hydrocarbon liquid, chromium trioxide in water, chromium trioxide in acetonitrile, chromium acetate in water, chromium nitrate in alcohol, dicumene chromium, dibenzene chromium in hydrocarbon, or combinations thereof.

33. The method of claim 1 wherein the tin-containing compound comprises a tin (II) halide.

* * * * *